April 4, 1961

A. M. PASINSKI 2,978,172

CARRIAGE OVERTRAVEL MECHANISM FOR BUSINESS MACHINES

Filed Nov. 14, 1957

INVENTOR.
ARTHUR M. PASINSKI
BY
Wallace P. Lamb
ATTORNEY.

INVENTOR.
ARTHUR M. PASINSKI
BY
Wallace P. Lamb
ATTORNEY.

April 4, 1961  A. M. PASINSKI  2,978,172
CARRIAGE OVERTRAVEL MECHANISM FOR BUSINESS MACHINES
Filed Nov. 14, 1957  3 Sheets-Sheet 3

INVENTOR.
ARTHUR M. PASINSKI
BY
Wallace P. Lamb
ATTORNEY.

United States Patent Office 2,978,172
Patented Apr. 4, 1961

2,978,172

CARRIAGE OVERTRAVEL MECHANISM FOR BUSINESS MACHINES

Arthur M. Pasinski, Detroit, Mich., assignor to Burroughs Corporation, Detroit, Mich., a corporation of Michigan Filed Nov. 14, 1957, Ser. No. 696,552

2 Claims. (Cl. 235—60.5)

This invention relates generally to calculating machines and particularly to the mounting of a function control on a platen carriage.

As is well known, in certain types of calculating machines, the several functions that may be performed, such as add, subtract, total taking, etc., are under control of a program controlling mechanism carried by the platen carriage of the machine. During operation of the machine, the carriage tabulates to several columnar positions in which the program controlling mechanism is intended to align with, and determine movement of a function control member or tappet, the carriage being abruptly arrested in said positions by positive stops to insure alignment. The sudden stopping of the carriage causes undesirable jarring of the machine and resultant noise, which is particularly undesirable in the larger types of machines because of the greater inertia of the heavy carriages. In the past, buffers and shock absorbers of one kind or another have been provided to cushion carriage stopping, but such devices acted on the carriage prior to engagement with the stops with the result that they had the effect of slowing carriage operation and more objectionable, they had the effect of causing misalignment of the function controlling mechanism with the function controlled member or tappet.

Accordingly, one of the objects of the invention is to provide in a calculating machine having a program controlling mechanism carried by a traveling carriage, for abruptly stopping the program controlling mechanism at a predetermined selected position and simultaneously with the stopping of the controlling mechanism, decreasing the shock of deceleration to the carriage.

Another object of the invention is to obtain a substantial decrease in the jar and noise of stopping a heavy carriage, while at the same time, positively stopping the program controlling mechanism carried thereby without affecting the accuracy of alignment of the program controlling mechanism with the controlled member.

Specifically, it is an object of the invention to connect the program controlling mechanism for horizontal travel with the carriage solely by a resilient connection and stopping the carriage by positive stopping of the control mechanism, to provide for slight overtravel cushioning of the carriage.

A further object of the invention is to provide a double acting resilient connecting means between the program controlling mechanism and the carriage, such that the program controlling mechanism floats horizontally with respect to carriage travel.

Other objects of the invention will become apparent from the following detailed description taken in connection with the accompanying drawings, in which.

Figure 1:
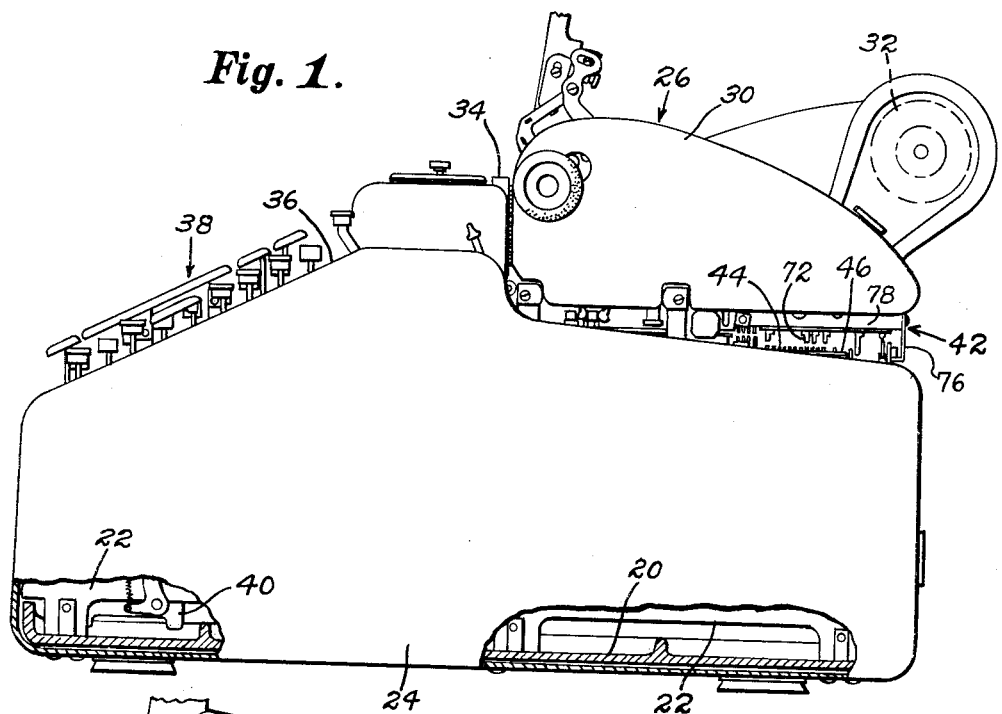
Fig. 1 is a side view of a calculating machine embodying features of the invention.
Figure 2:
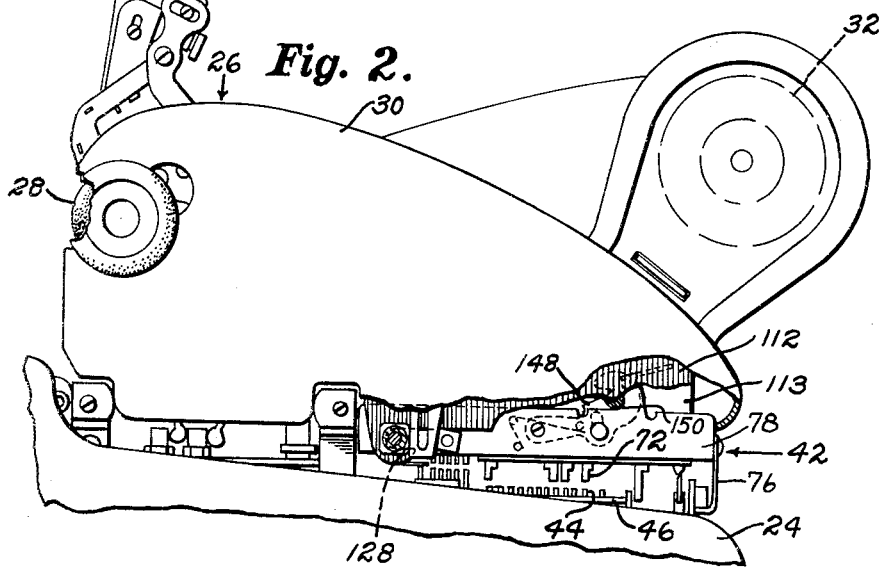
Fig. 2 is a fragmentary enlarged view shown partly broken away and in section, of the machine of Fig. 1.

Referring to the drawings by characters of reference, the calculating machine shown includes the usual base 20 and frame 22 on which all of the various mechanisms and devices of the machine are mounted and most of which are enclosed by a casing 24. Mounted on the frame 22, at the rear thereof, is a carriage, designated generally by the numeral 26 for a roller type platen 28, the carriage 26 being slidably guided on the frame for transverse tabulation movement in the well known manner. Preferably, a cover 30 is provided for the carriage 26 and platen 28, and mounted on the cover is a paper feed roll 32 for supplying paper to the platen. Suitable print elements 34 are located adjacent and forward of the platen 28 and are operatively connected to amount entering keys on a keyboard 36 at the front of the machine. The keys are designated generally by the numeral 38, but it will be understood that the keyboard 36 will usually include in addition to amount entering keys, a total key, a sub-total key, function control keys, and a motor bar to initiate machine cycling operation. An accumulator of crossfooter mechanism 40 is mounted on the frame 22 and is operatively connected to the amount keys and to the function keys, the latter of which, of course, may be used to effect a subtract function, a non-add function etc., in the crossfooter. Carried by and on the underside of the carriage 26 is a control device, designated generally by the numeral 42 which controls operation of the crossfooter 40 automatically in response to carriage movement.

Figure 3:
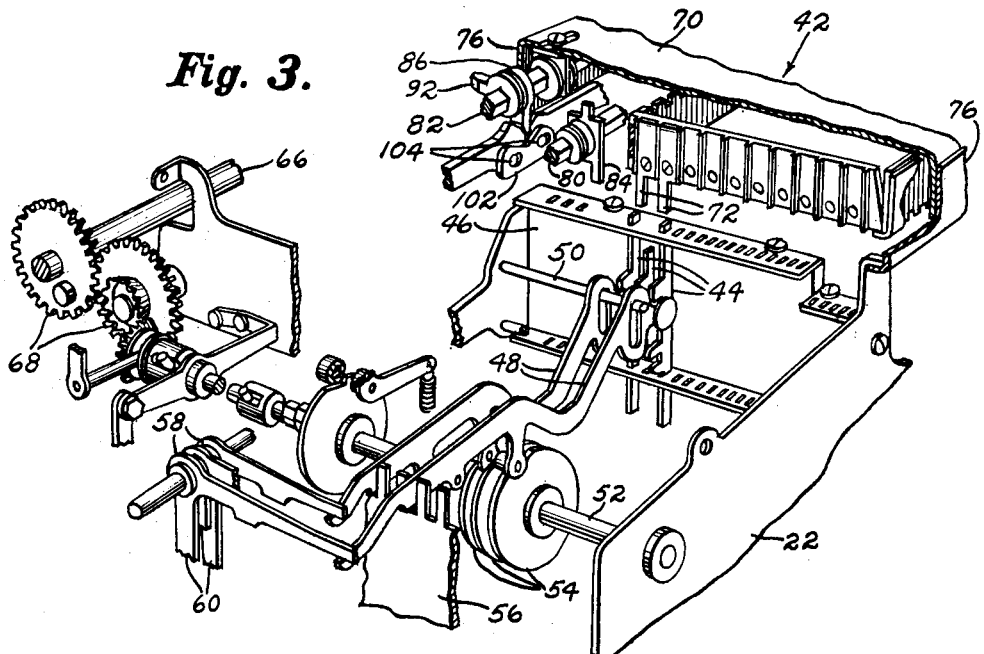
Fig. 3 is a perspective view of part of the mechanism of the calculating machine.
Figure 4:
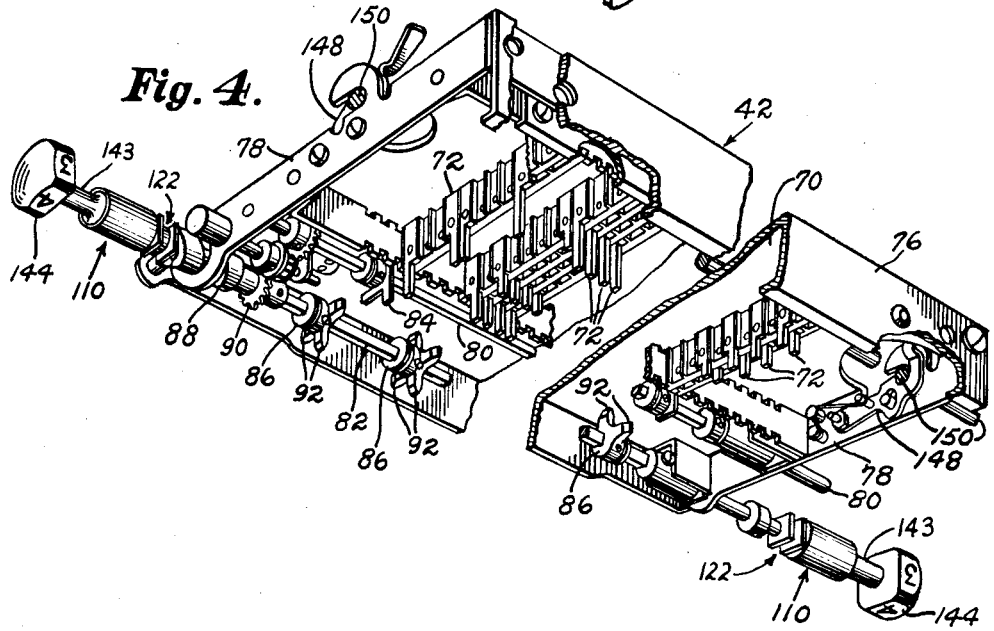
Fig. 4 is a perspective view of a program controlling mechanism for the machine.

The control device 42 is operatively connected to the crossfooter 40 by a plurality of well known interconnecting mechanisms each of which may include a vertically movable sensing tappet 44. The tappets 44 are located beneath the control device 42 for control thereby, and a guide 46 restrains appreciable movement of the tappets other than vertical movement. Each of the interconnecting mechanisms further includes a rockable sensing lever 48 having ends thereof pivotally connected respectively to the tappets 44, the levers 48 also having vertical slots adjacent the pivoted ends thereof to receive a fixed horizontal guide rod 50 fixed to the machine frame. As shown in Fig. 3, the sensing levers 48 extend transversely to and above a cam shaft 52 on which cams 54 are adapted and arranged to rock the levers on cycling operation of the machine. A driving shaft 66 drives the cam shaft 52 through suitable gearing 68. Adjacent their free ends, the levers 48 are vertically guided in slots provided in the upper edge of a plate 56. The free ends of the levers 48 engage the lower edges respectively of arms of bell cranks 58 which have depending arms 60 that are operatively connected to the crossfooter by mechanism (not shown) which is well known in the art and constitutes no part of the present invention. With respect to the present invention, any well known type of mechanism for interconnecting the tappets 44 and the crossfooter 40 may be used and for a complete description of such a mechanism, reference may be had to the patent to Thomas M. Butler, U.S. Patent No. 2,629,549.

Referring now to the control device 42, this is a well known device, shown and described in the above mentioned Butler patent, the device comprising, in general, a support or panel 70 and a plurality of stop, or sensing pins 72. The pins 72 are carried by and depend from the underside of the panel 70 for abutment by the upper ends of the tappets 44 to determine vertical movement of the latter. The pins 72 are of different length representing different crossfooter functions and are arranged in lanes on the underside of the panel 70 in accordance with predetermined programs that are prepared to control the machine functions necessary for certain different accounting systems. As is well known, the lanes of pins 72 extend in the direction of carriage travel.

The panel 70 is preferably a sheet metal fabrication of general rectangular shape having reinforcing flanges including front and rear side flanges 76 and right and left end flanges 78. Journaled in the panel right and left end flanges 78 is a pair of spaced parallel shafts 80 and 82 which extend longitudinally of the panel, laterally positioned from the lanes of sensing pins 72, and adjacent the front side flange 76 of the panel. Secured to and spaced along shaft 80 is a plurality of control projections 84 which control tabulation and skip tabulation of the carriage, and secured to and spaced along the other shaft 82 is a plurality of stop members 86 that are provided to stop the carriage in different columnar positions under control of projections 84. The present control device 42 is provided with four different accounting programs, a change from one to another of which is accomplished by shifting the panel 70 and therefor the sensing pins 72 in the direction of carriage travel relative to the tappet 44. This is accomplished by manual rotation of shaft 82 on which cam 88 fixed to the shaft imparts axial movement to the panel 70, and at the same time, rotates shaft 80 through gearing 90. Thus, when the sensing pins 72 are shifted relative to the tappets 44, the stops 86 and control projections 84 are rotated, but as will later be seen, the shafts 80, 82 and therefor the stops 86 and projections 84 are held against axial movement, and the control panel moves instead.

Figure 5:
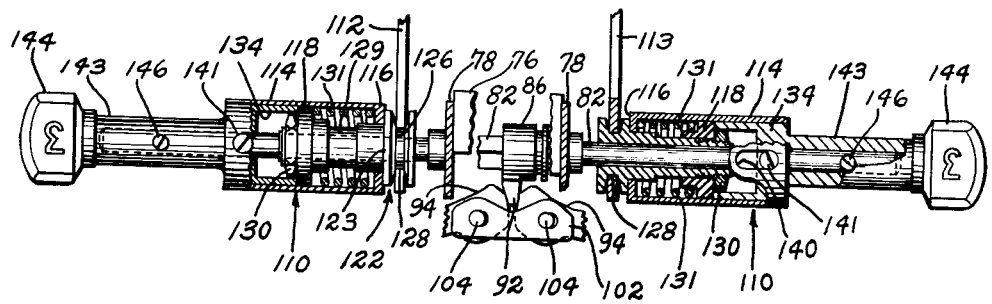
Fig. 5 is a view partly in elevation, and partly in section, of a carriage shock absorbing device for the machine.
Figure 9:
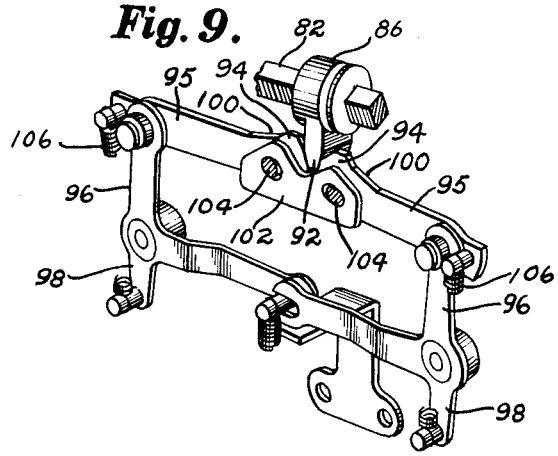
Fig. 9 is a perspective view of certain mechanisms associated with the shock absorbing device.

As shown, each of the stop members 86 has a number of stop lugs 92 radially spaced in accordance with the program arrangement of the sensing pins 72 such that the proper lugs are in effective position for each program. Normally, one or another of the stop lugs 92 will engage and be held tightly between cooperating stop means, or a pair of counter stop members 94, as shown for example, in Figs. 5, 6 and 9. The counter stop members 94 are located preferably midway of the width of the machine and as will be seen by reference to the Butler patent, may be mounted on the frame of the machine.

The counter stop members 94 are formed on the ends of a pair of levers 95 which are arranged with members 94 in opposed relation to receive and hold one of the stop lugs 92 therebetween. Also, the levers 95 are pivoted at their outer ends on the upper ends respectively of a pair of arms 96 of horizontally spaced levers 98. On their upper edges, the counter stop members 94 have cam surfaces 100 to permit an approaching one of the stop lugs 92 to engage between the counter stop members 94, the approaching stop lug engaging the cam 100 and depressing the corresponding counter stop member. A link 102 connects the opposed ends of the counter stop members 94 together to prevent them from spreading apart when struck by a stop lug 92, and thus prevent rebound of the control device 42. To allow relative pivoting of the counter stop members 94, the link 102 is provided with longitudinally spaced slots to receive respectively a pair of pins 104 that are fixed to and extend laterally from the counter stop members, the pins 104 engaging in the outer ends of the slots.

The levers 95 are urged in opposite directions by individual springs 106 which return the counter stop members 94 to normal positions following depression by one of the stop lugs 92. The springs 106 are connected respectively to the outer ends of levers 95 and may be anchored at their lower ends to the lower arms of levers 98. In addition to the levers 98, the counter stop members 94 are operatively connected by interconnecting mechanism (not shown) for operation from the keyboard and from the drive shaft 66, under control of the control projections 84. The interconnecting mechanism is not shown or described, as it is well known in the art and constitutes no part of the present invention. However, in general, the interconnecting mechanism under control of the control projections effects withdrawal of one or the other of the counter stops 94 to release the carriage for movement, the counter stop released depending upon the direction of travel of the carriage. Any suitable interconnecting mechanism may be employed such as that shown and described in the above mentioned Butler patent.

In accordance with my invention, the program control device 42, carrying the stop lugs 92, is connected to the relatively heavy carriage 26 for horizontal travel therewith by a pair of resilient mountings, or cushioning devices, designated generally by the numerals 110. The cushioning devices 110, are supported respectively on spaced upright frame members 112, 113 of the carriage frame, and in turn support the program control device 42, the cushioning devices 110 being positioned outwardly of opposite ends of panel 70 and receiving the program selector shaft 82.

Figure 8:
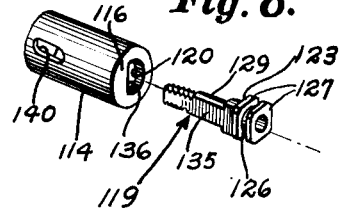
Fig. 8 is a perspective view showing certain details of the shock absorbing device.

As the cushioning devices 110 are alike, only one of them is herein described in detail so as to avoid unnecessary repetitious description. Referring to the cushioning device 110, a cylinder 114 surrounds and is coaxial with the program selecting shaft 82, the cylinder having a head or end wall 116 disposed toward and adjacent the carriage frame member 112. Within the cylinder 114 on shaft 82 is a plunger 118 which has a connecting rod 119 that extends externally of the cylinder through a guide aperture 120 therefor. Externally of the cylinder 114, the plunger connecting rod 119 is formed with an enlarged end portion connector or head 122, providing a shoulder 123 that normally abuts the outer face of the cylinder end wall 116 as a stop. In the outer periphery of the head 122 is an annular bearing 126 that rests in a hook-like seat 128 provided in the lower edge of the upright carriage frame member 112. The other cushioning device 110 has a like bearing 126, and these bearings support the program control device 42 at the front edge thereof on the carriage 26. The bearings 126 each have spaced apart flanges 127 providing annular retainer sockets to receive respectively the carriage frame member 112 and 113 to connect the plunger 118 to the carriage, the heads 122 thus functioning as connectors between the carriage and the cushioning devices. In the present construction, the plunger 118 is a composite member of which the bearing 126 is a separate part formed on one end of the connecting rod 119 that connects the bearing to the plunger 118. The connecting rod 119 has a shank 129 provided with an axial bore therethrough to receive shaft 82, and extending through the plunger 118 has a threaded end on which a nut 130 is tightened down to secure the plunger 118 to the shank 129. To provide for turning of the bearing 126 with the cylinder 114 upon changing from one program to another, the shank 129 is provided with a flat surface 135 to engage a corresponding flat surface 136 in the head 116 of the cylinder 114, as shown for example in Fig. 8. Surrounding the plunger 118 within cylinder 114 is a cushioning member or helical coil spring 131 having one end seating against the cylinder end wall 116, and the other end seating against the plunger 118. Outward movement of plunger 118 by spring 131 is limited by engagement of the shoulder of bearing 126 against the end 116 of cylinder 114. By this construction and arrangement, the control device 42 is connected to move horizontally with the carriage through the medium of springs 131.

Slidable in the outer end of cylinder 114 is a second plunger and stop member 134 having an aperture 138 through the side thereof, which aligns with slot 140 in the wall of cylinder 114. The slot 140 extends lengthwise of the cylinder 114 and receives the head of a screw 141 that threads into the side of stop member 134 to limit horizontal movement thereof. The stop member 134 has a hollow shaft 143 integral therewith and into this shaft extends an end portion of the program selecting shaft 82. A set screw 146 attaches the stop member 134 to the program selecting shaft 82. For convenience in turning the program selecting shaft 82, a knob 144 may be secured to the end of shaft 143.

With reference to the left hand cushioning device 110, it will be seen that the stop member 134 is connected by screw 146 to the shaft 82 and that movement of cylinder 114 to the right is prevented by the screw 141 with the result that on overtravel of the carriage to the right, the cylinder 114 will remain in the position shown, allowing the plunger 118 to compress spring 131. At the same time, the cylinder 114 of the right hand cushioning device is moved outwardly compressing spring 131, the plunger 118 being held against outward movement by the stop 134 through the screw connections to shaft 82 and stop 92. Thus, each of the cylinders and its plunger 118 constitute relatively alternately movable members opposed in both directions of movement by compression forces of the springs 131.

A pair of latches 148 are pivoted respectively to the right and left opposite end flanges 78 of the control panel 70 adjacent the rear flange 76 and together with the hooks 128 at the front of the panel 70 suspend the program control device 42 from the carriage. The latches engage over a cross bar 150 on the carriage frame, but like hooks 128, permit relative movement horizontally between the carriage and the program control device.

Operation

Figure 6:
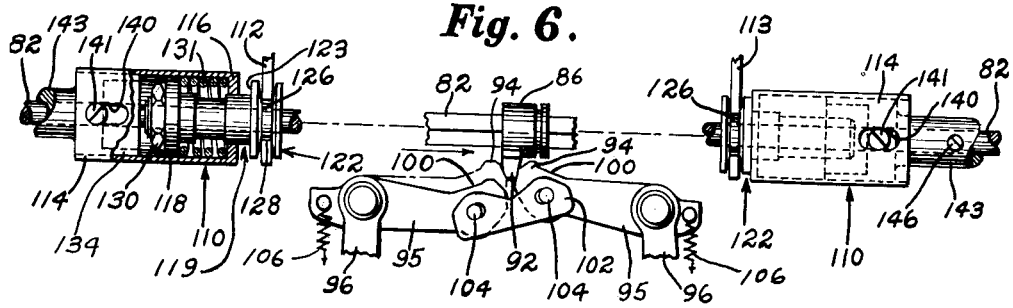
Fig. 6 is a view similar to Fig. 5.
Figure 7:
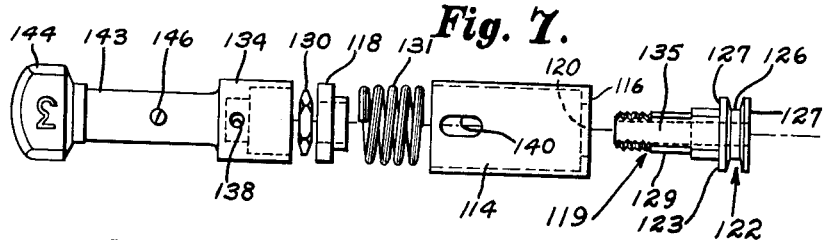
Fig. 7 is an exploded view showing certain of the parts of the shock absorbing device and the manner of their assembly.

In operation of the machine when the carriage is tabulated to move from one columnar position to another, one of the stops 92 will engage between the counter stop members 94, which will abruptly arrest movement of the program control device 42 to insure that the sensing pins 72 will align properly with the sensing tappets 44. Because of the inertia of the relatively heavy carriage, and the provision of the cushioning devices 110, the carriage will overtravel past the stopping point of the program control device, during which time the cushioning devices 110 function to decrease the shock of deceleration of the carriage and quickly return the carriage to normal position to establish proper relation between the platen and the print elements. Assuming that the carriage is traveling from left to right with respect to Fig. 5, it will be seen that when the program control device is stopped, continued movement of the carriage will compress spring 131 of the left hand cushioning device 110 by movement of the plunger 118 relative to the cylinder 114 as illustrated in Fig. 6. At the same time, the plunger 118 of the right hand cushioning device is held against movement by the outer stop plunger 134 and the cylinder 114 is moved in the direction of travel of the carriage, thus, compressing its spring 131. Thus, it will be seen that, in travel of the carriage in either direction, the springs 131 of both of the cushioning devices 110 are compressed to oppose and cushion the overtravel movement of the carriage and to bring the carriage to a quick stop in normal position.

From the foregoing description, it will now be appreciated that I have provided in a calculating machine of the type having a traveling carriage, for mounting a control device resiliently on the carriage so that the control device can be stopped abruptly at a desired position and thereafter the carriage cushioned against the shock of deceleration to the carriage. It will further be appreciated that although the carriage is allowed to overtravel slightly so as to insure that the control device is stopped in the proper position, the carriage is quickly returned to and stopped in normal position by reason of the two-way acting cushioning devices. In addition, I have provided a resilient mounting connection between the carriage and the control device which is carried by and removable with the control device as a unitary structure.

While I have shown and described my invention in considerable detail, it will be understood that the invention may have many variations without departing from the scope and spirit of the invention.

What is claimed is:

1. In a business machine, supporting means, a movable carriage supported by said supporting means, a sleeve bearing member mounted on said carriage, said bearing member arranged with its axis longitudinally of the path of travel of said carriage, a shaft received in and supported by said bearing member for rotation and also for relative sliding movement with said bearing member, a movable support carried by and operatively connected to said shaft for movement therealong by rotation of said shaft, said support movable to any one of a plurality of positions, a plurality of sensing pins on said support arranged to effect different machine function programs in different ones of said plurality of positions of said support, stop means carried by said shaft and cooperable with stop means on said supporting means to stop said support in predetermined positions, and spring means interposed between and yieldably connecting said bearing member and said shaft.

2. In a business machine, supporting means, a movable carriage on said supporting means, a sleeve bearing member carried by said carriage, said bearing member arranged with its axis extending longitudinally of the path of movement of said carriage, a shaft rotatably supported by said bearing member and also supported for relative axial sliding movement with said bearing member, a support mounted on said shaft and movable therealong to different positions of adjustment and movable to said positions by rotation of said shaft, means operatively connecting said shaft and said support, a plurality of sensing elements carried by said support and movable therewith to different ones of said positions to effect different programs of functional operations of the machine, stop means carried by said shaft and cooperable with stop means on said supporting means to stop movement of said support, a cylinder surrounding said shaft and attached thereto, said cylinder normally having one end thereof abutting one end of said bearing member, a plunger within said cylinder and attached to said bearing, and a coil spring within said cylinder between said plunger and said cylinder yieldingly opposing movement therebetween without opposing rotation of said shaft.

References Cited in the file of this patent

UNITED STATES PATENTS

| | | |
|---|---|---|
| 2,284,803 | Crosman | June 2, 1942 |
| 2,635,732 | Butler | Apr. 21, 1953 |